Figure 1:
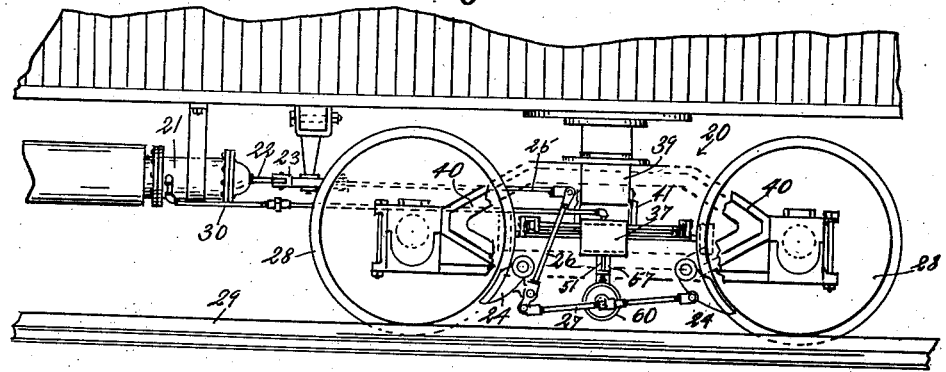

F. JAMES.
BRAKE GOVERNING APPARATUS.
APPLICATION FILED OCT. 28, 1913.

1,088,074.

Patented Feb. 24, 1914.

4 SHEETS—SHEET 1.

WITNESSES:
W. M. Gentle.
Edith Ramsey.

INVENTOR.
Frank James
By
ATTORNEY.

F. JAMES.
BRAKE GOVERNING APPARATUS.
APPLICATION FILED OCT. 28, 1913.
1,088,074.
Patented Feb. 24, 1914.
4 SHEETS—SHEET 2.
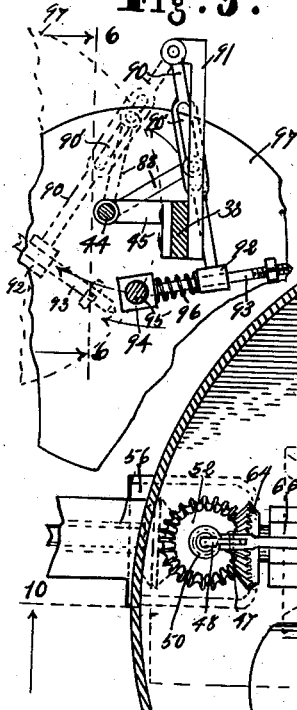
Fig. 5.
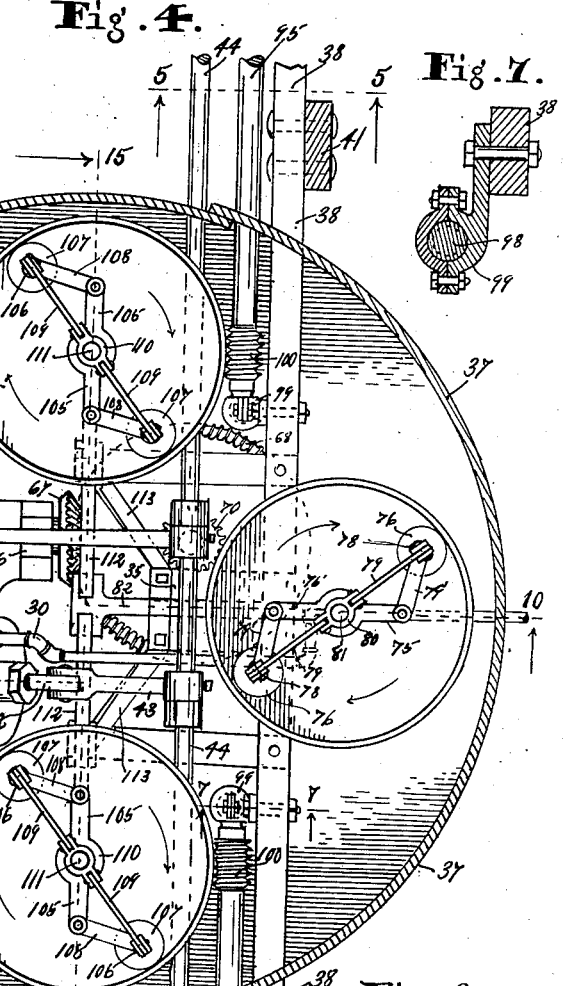
Fig. 4.
Fig. 7.
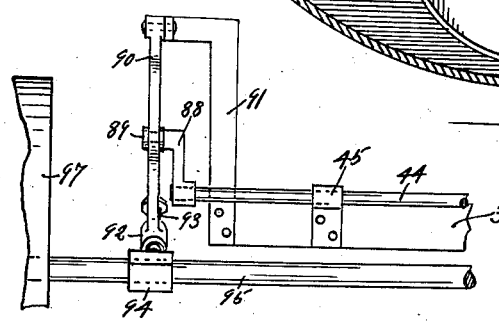
Fig. 6.
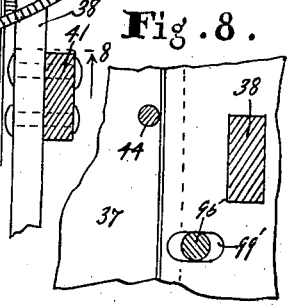
Fig. 8.
WITNESSES
W. M. Gentle.
Edith Ramsey.
INVENTOR.
Frank James
By
ATTORNEY.

F. JAMES.
BRAKE GOVERNING APPARATUS.
APPLICATION FILED OCT. 28, 1913.
1,088,074.
Patented Feb. 24, 1914.
4 SHEETS—SHEET 3.
Fig. 9.
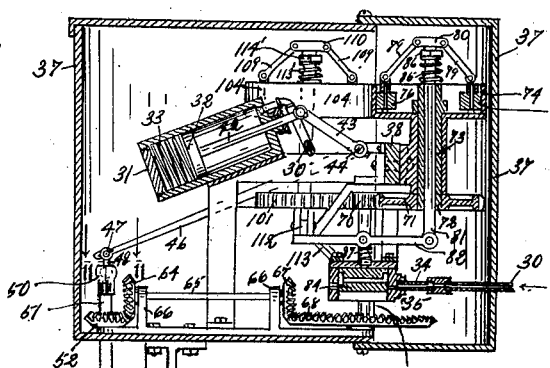
Fig. 14.
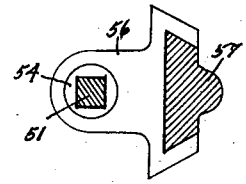
Fig. 10.
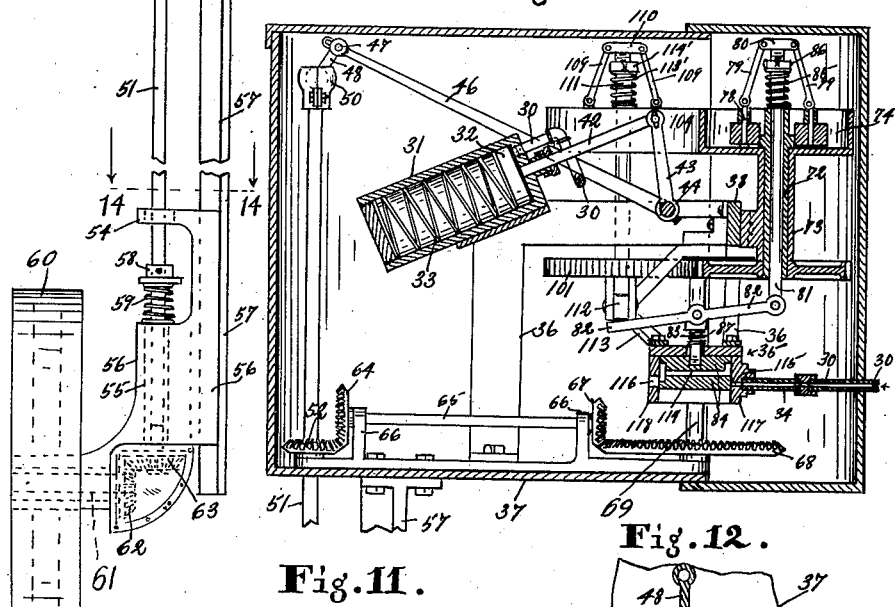
Fig. 11.
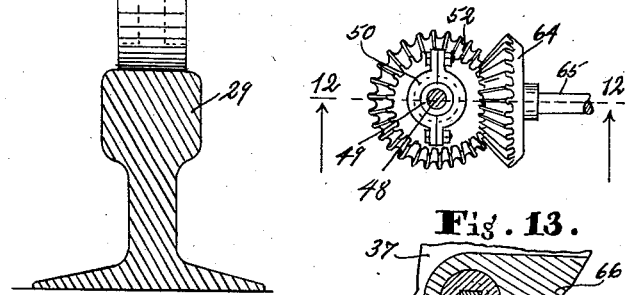
Fig. 12.
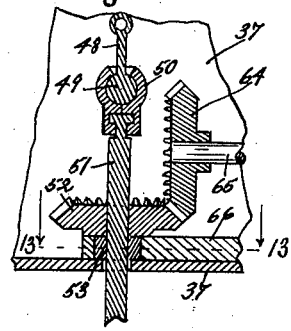
Fig. 13.
WITNESSES:
W. M. Gentle.
Edith Ramsey
INVENTOR.
Frank James
By
Alex. N. Kidders
ATTORNEY.

F. JAMES.
BRAKE GOVERNING APPARATUS.
APPLICATION FILED OCT. 28, 1913.

1,088,074.

Patented Feb. 24, 1914.

4 SHEETS—SHEET 4.

WITNESSES:
W. M. Gentle
Edith Ramsey

INVENTOR.
Frank James
By
ATTORNEY.

UNITED STATES PATENT OFFICE.

FRANK JAMES, OF LOS ANGELES, CALIFORNIA.

BRAKE-GOVERNING APPARATUS.

1,088,074.  Specification of Letters Patent.  Patented Feb. 24, 1914.

Application filed October 28, 1913. Serial No. 797,907.

*To all whom it may concern:*

Be it known that I, FRANK JAMES, a citizen of the United States of America, residing at Los Angeles, county of Los Angeles, State of California, have invented a certain new and useful Brake-Governing Apparatus; and I do hereby declare the following to be a full, clear, and exact description of the invention, such as will enable others skilled in the art to which it appertains to make and use the same.

This invention relates to brake governing apparatus, and it may be said to consist in the provision of the novel and advantageous features and in the novel and improved construction, arrangement, and combination of parts and devices as will be apparent from the description and claims which follow hereinafter.

One object of the invention is to provide novel and improved apparatus of the class specified which is adapted to be used in connection with the ordinary brake mechanism to control the latter when it acts to cause skidding of the car wheels on the rails.

Another object of the invention is to provide novel and improved apparatus of the class specified which is automatically operatively connected with the car wheels when the brake mechanism is operated and is adapted to reduce the force of action of the brake mechanism when the latter prevents rotation of the car wheels.

A further object of the invention is to provide novel and improved apparatus of the class specified which is adapted to act automatically to control the brake mechanism in operation so that the latter does not hold the car wheels from turning and thus the brake mechanism is caused to act effectively and damage to the car wheels and rails by the skidding of the car wheels is avoided.

A further object of the invention is to provide novel and improved apparatus of the class specified which is adapted to reduce the pressure of the air acting on the brake mechanism should the latter prevent rotation of the car wheels in operation.

Further objects of the invention are to provide novel and improved apparatus of the class specified which is simple and compact in construction; small in size, strong and durable, economical to install and maintain; light in weight, and effective in action.

Other objects and the advantages of the invention will be apparent to those skilled in the art from a consideration of the following description of the preferred form of apparatus embodying the invention, taken in connection with the accompanying drawings in which—

Figure 2:
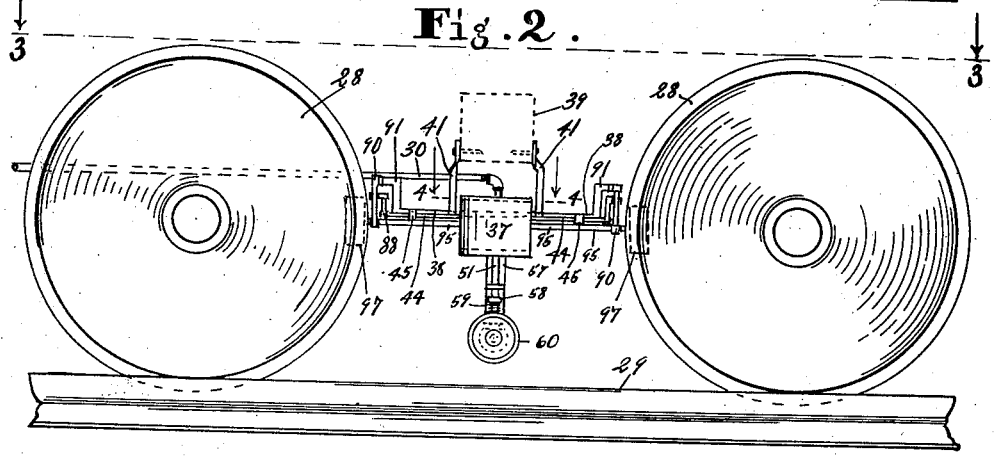
Figure 3:
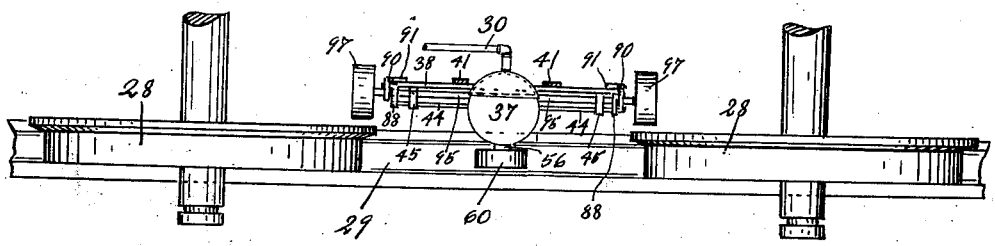
Figure 15:
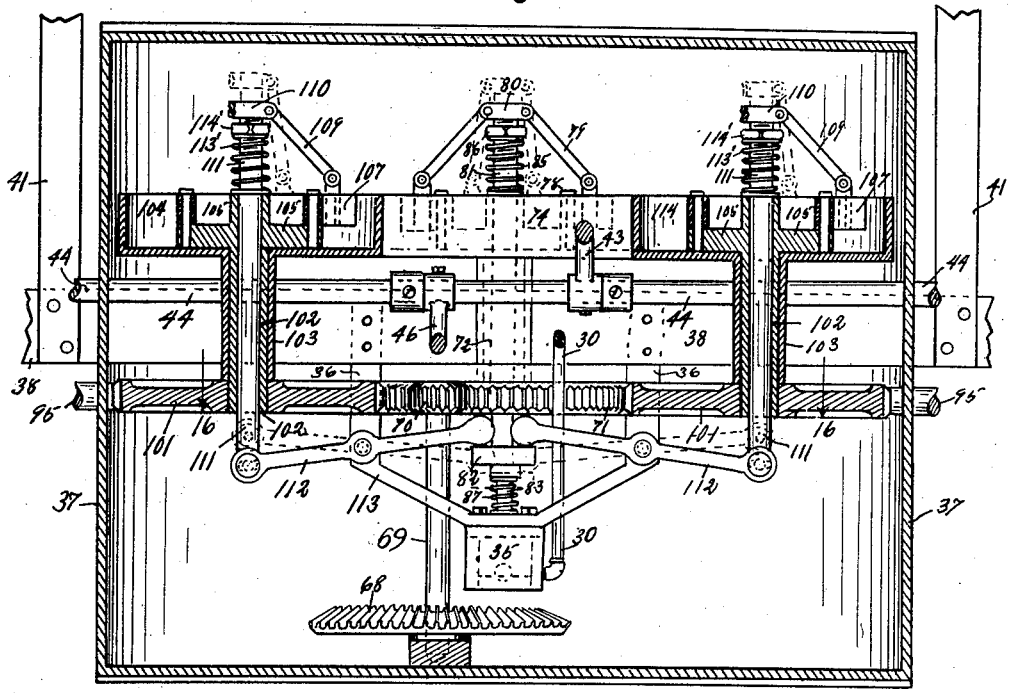
Figure 16:
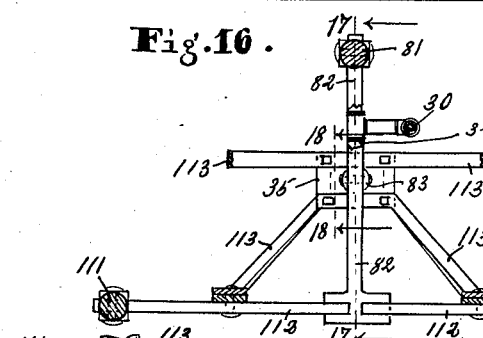
Figure 18:
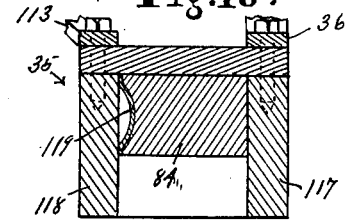
Figure 17:
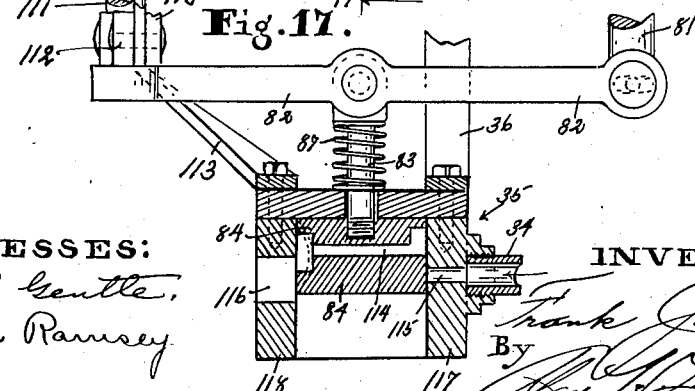

Figure 1 is a partly broken view showing the governing apparatus applied to the brake mechanism of a railway car; Fig. 2 is a partly broken elevational view showing the governing apparatus arranged adjacent to the car wheels; Fig. 3 is a plan view of the same taken on the line 3—3 of Fig. 2; Fig. 4 is an enlarged broken and sectional view taken on the line 4—4 of Fig. 2; Fig. 5 is a partly broken view of a portion of the governing apparatus beyond the line 5—5 of Fig. 4; Fig. 6 is a view of the same taken on the line 6—6 of Fig. 5; Fig. 7 is an enlarged sectional view taken on the line 7—7 of Fig. 4; Fig. 8 is a broken and sectional view taken on the line 8—8 of Fig. 4; Fig. 9 is a partly broken and sectional view showing parts of the governing apparatus in changed position; Fig. 10 is a sectional view taken on the line 10—10 of Fig. 4 but reduced in size; Fig. 11 is an enlarged broken and sectional view taken on the line 11—11 of Fig. 9; Fig. 12 is a broken sectional view of the same and adjacent parts taken on the line 12—12 of Fig. 11; Fig. 13 is a broken sectional view taken on the line 13—13 of Fig. 12; Fig. 14 is an enlarged sectional view taken on the line 14—14 of Fig. 9; Fig. 15 is a broken and sectional view of the governing apparatus taken on the line 15—15 of Fig. 4; Fig. 16 is a sectional view of the same taken on the line 16—16 of Fig. 15; Fig. 17 is an enlarged broken and sectional view of the same taken on the line 17—17 of Fig. 16; and Fig. 18 is an enlarged broken and sectional view taken on the line 18—18 of Fig. 16.

The railway car 20 has mounted thereon suitable air brake mechanism which may be of the ordinary construction and includes the cylinder 21 having therein a piston the rod 22 of which is pivotally connected to one end of the pivotally mounted lever 23 which latter is operatively connected with the brake shoes 24 by means of a link 25 which is pivotally connected to the lever 23, and links 26 and 27 which are pivotally connected to each other and to the link 25 and to the shoes 24. The shoes 24 are disposed adjacent to the car wheels 28 which travel on the rails 29.

As is well known in the operation of the brake mechanism the brake shoes often grip the car wheels with such force as to cause skidding of the car wheels on the rails. The skidding prevents the best braking effects and produces a flattening of the tread of the car wheels and wear of the rails. In a train of railway cars which latter vary in size and weight, the proper application of the brake mechanism to the heavier cars may cause skidding of the wheels of the lighter cars.

The brake governing apparatus which is designed to minimize skidding of the car wheels on the rails will now be described.

The pipe 30 is connected to the head end of the cylinder 21—or to the pipe which supplies air to the cylinder 21—, and to the cylinder 31 which latter has therein a piston 32 pressed by a spring 33. A branch pipe 34 is connected between the pipe 30 and the valve box 35. The cylinder 31 and the valve box 35 are suitably mounted on a frame 36 within the casing 37 which latter is mounted on a frame 38 suitably secured by straps 41 to the bolster 39 of the car truck 40. The rod 42 of the piston 32 is pivotally connected with one end of an arm 43 which has the other end thereof mounted fast on a shaft 44 which extends through the casing 37 and has the end portions thereof freely mounted in bearings 45 on the frame 38. An arm 46 has one end thereof mounted fast on the shaft 44 and has the other end thereof slotted and connected by a pin 47 fitted through the slot to one end of a link 48 which latter has on its other end a ball 49 which is freely fitted in a socket 50. A square rod 51 has its upper end rotatably connected to the socket 50 and passes through the bevel gear 52 and the bearing 53 in the casing 37, and through the bearing 54 and into the bearing sleeve 55 on the block 56 which is slidably mounted on the guide 57 which has the upper end thereof suitably secured to the casing 37. The rod 51 has fast thereon a collar 58 between which and the block 56 is interposed a coil spring 59. A wheel 60 has the shaft 61 thereof bearing in the lower end portion of the block 56, and said shaft 61 has thereon a bevel gear 62 which is in mesh with a bevel gear 63 fast on the lower end of the bearing sleeve 55. The bevel gear 52 is in mesh with a bevel gear 64 fast on one end of a shaft 65 which bears in standards 66 in the casing 37 and has on its other end a bevel gear 67 in mesh with a bevel gear 68 on a shaft 69 which latter has thereon a spur pinion 70 in mesh with a spur wheel 71 fast on a hollow spindle 72 which bears in a sleeve 73 which sleeve 73 is suitably mounted on the frame 38 and has its upper end portion increased in diameter to form the bowl 74. The spindle 72 has thereon arms 75 to which and to the shafts 78 of the weights 76 are pivotally connected the links 79'. Links 79 are pivotally connected to the shafts 78 and to a crosshead 80 on the upper end of a rod 81 which passes movably through the spindle 72 and has its lower end pivotally connected to one end of a lever 82 which latter is fulcrumed at its center on the upper end of the stem 83 of the valve 84 disposed in the valve box 35. A coil spring 85 is arranged between the spindle 72 and a collar 86 on the rod 81, and a coil spring 87 is arranged between the valve box 35 and the head of the stem 83. On the ends of the shaft 44 are secured one end of arms 88 which have pins 89 on the other end thereof fitted in the slots 90' of links 90 which latter have one end thereof pivotally mounted on arms 91 on the frame 38 and have on the other end thereof bosses 92 in which are movably mounted the rods 93 which latter have thereon bearings 94 for the shafts 95. Coil springs 96 are interposed between the bosses 92 and the bearings 94. The shafts 95 pass through slots 99' in the casing 37 and have wheels 97 mounted fast on the outer ends thereof and have on the inner ends thereof balls 98 fitted in sockets 99 which latter are suitably secured to the frame 38. Worms 100 at the inner ends of the shafts 95 mesh with worm wheels 101 which are mounted fast on hollow spindles 102 which are rotatably mounted in bearing sleeves 103 which latter have the upper end portion thereof increased in diameter to form the bowls 104. The spindles 102 have thereon arms 105 to which and to the shafts 106 of the weights 107 are pivotally connected the links 108. Links 109 are pivotally connected to the shafts 106 and to crossheads 110 on the upper end of rods 111 which pass movably through the spindles 102 and have the lower end thereof pivotally connected to one end of levers 112 which latter are fulcrumed centrally on the bar 113 which is suitably secured to the valve box 35. The other end of the levers 112 bear against the free end of the lever 82. Coil springs 113' are arranged between the upper end of the spindles 102 and collars 114' on the rods 111.

The valve 84 is provided with a passageway 114 which when the valve 84 is moved downwardly is brought into alinement with passageways 115 and 116 in the walls 117 and 118 of the valve box 35 so that air may escape from the pipe 34. One or more springs 119 press the valve 84 against the wall 117 to prevent leakage of air between the valve 84 and the wall 117.

From the foregoing it will be understood that when the brake mechanism is operated, air passes to the cylinder 31 and moves the spring-pressed piston 32 which is operatively connected and acts to partially rotate the shaft 44, see Fig. 9. The partial rotation of the shaft 44 moves the arm 46 and rod 51 and thereby the block 56 is moved downwardly to cause the wheel 60 to run on the rail 29, whereupon the rod 51 is rotated as is also the spindle 72. Rotation of the spindle 72 causes the weights 76 by centrifugal force to move the links 79 and cause a downward movement of the rod 81 and consequently of one end portion of the lever 82 which is operatively connected to the valve 84. The bowl 74 limits the outward movement of the wheels 76. The partial rotation of the shaft 44 also moves the arms 88 and links 90 and consequently the shafts 95 to have the wheels 97 contact with the inner sides of the car wheels 28, whereupon the shafts 95 and consequently the spindles 102 are rotated so long as the car wheels rotate. Rotation of the spindles 102 causes the wheels 107 by centrifugal force to move the links 109 and cause a downward movement of the rods 111 and consequently an upward movement of the end portions of the levers 112 bearing on the free end of the lever 82. Should the brake mechanism be applied so strongly that it prevents rotation of either of the car wheels 28, the wheels 97 will not be rotated and the springs 113′ will act to lift the rods 111 and consequently cause the free end portions of the levers 112 to bear down on the free end of the lever 82, and, the other end of the lever 82 being also pressed down by rod 81, the lever 82 will move the valve 84 downwardly to permit escape of air from the pipe 34 until the car wheels begin to rotate and thereby again cause rotation of the spindles 102 and a downward movement of the rods 111 and consequently an upward movement of the valve 84 to prevent further escape of air from the pipe 34. When the brake mechanism is not in operation, the spring 33 moves the piston 32 and consequently the shaft 44, and the operative connections between the shaft 44 and the wheel 60 and wheels 97 cause the wheel 60 to be raised out of contact with the rail 29 and the wheels 97 to be moved out of contact with the car wheels 28.

While one form of construction embodying the invention has been particularly illustrated and described, there are many changes and modifications thereof that will readily occur to those skilled in the art—wherefore the right is reserved to all such changes and modifications as do not depart from the spirit and scope of the invention as defined in the appended claims.

I claim:

1. The combination with air actuated mechanism adapted to brake car-wheels mounted on rails, of a shaft, a wheel adapted to travel on one rail, a valve for reducing the pressure of the air, means operatively connected with said shaft for moving the wheel to position to travel on said rail, a lever operatively connected with said valve, operative connections between said wheel and said lever, wheels adapted to travel on the sides of the car-wheels, means operatively connected with said shaft for moving said wheels to position to travel on said car-wheels, shafts on said wheels, hollow spindles, spring-pressed rods passing through the spindles, pivotally mounted levers operatively connected with said rods and with said lever, operative connections between said shafts and said spindles, and means to operate said shaft when said mechanism is actuated.

2. The combination with air actuated mechanism adapted to brake car-wheels mounted on rails, of a valve for reducing the pressure of the air, means operated from one rail and means operatively connected with the car-wheels for opening said valve when said mechanism acts to prevent rotation of the car-wheels in operation.

3. The combination with air actuated mechanism adapted to brake car-wheels mounted on rails, of a valve for reducing the pressure of the air when said mechanism acts to prevent rotation of the car-wheels, a shaft, automatic means to operate the shaft when the mechanism is operated, a wheel adapted to travel on one rail, means operatively connected with the shaft for moving the wheel to position on the rail, operative connections between the wheel and the valve, wheels adapted to travel on the sides of the car-wheels, means operatively connected with the shaft for moving the wheels to position on the car-wheels, and operative connections between said wheels and said valve.

4. The combination with air actuated mechanism adapted to brake car-wheels mounted on rails, of a valve connected with the mechanism for allowing escape of the air to reduce the pressure of the air when the mechanism acts to prevent rotation of the car-wheels, a shaft, a spring-pressed piston operatively connected with said shaft, means for operating said piston when the mechanism is operated, means including wheels adapted to coact with one rail and with the car-wheels for actuating the valve, and means operatively connected with said shaft for moving the wheels to position of coaction with the rail and the car-wheels.

5. The combination with air actuated mechanism adapted to brake car-wheels mounted on rails, of a valve connected with the mechanism for allowing escape of the air to reduce the pressure of the air when the mechanism acts to prevent rotation of the car-wheels, a shaft, a spring-pressed piston operatively connected with said shaft, means for operating said piston when the mechanism is operated, a wheel adapted to travel on one rail, means operatively connected with said shaft for moving the wheel to position to travel on said rail, a lever operatively connected with said valve, operative connections between said wheel and said lever, wheels adapted to travel on the sides of the car-wheels, means operatively connected with said shaft for moving said wheels to position to travel on the car-wheels, shafts on said wheels, hollow spindles, spring-pressed rods passing through the spindles, pivotally mounted levers operatively connected with said rods and with said lever, and operative connections between said shafts and said spindles.

In testimony whereof, I have signed my name to this specification in the presence of two subscribing witnesses at Los Angeles, county of Los Angeles, State of California, this 20th day of October, A. D. 1913.

FRANK JAMES.

Witnesses:
 ALEX. H. LIDDERS,
 ELLA SCOTT.

---

Copies of this patent may be obtained for five cents each, by addressing the "Commissioner of Patents, Washington, D. C."